United States Patent Office 3,496,130
Patented Feb. 17, 1970

3,496,130
EPOXY RESIN COMPOSITIONS COMPRISING EPOXY RESINS TOGETHER WITH (A) AN ADDUCT OF AN EPOXY RESIN AND A POLYAMINE AND (B) A PHENOLALDEHYDE RESIN AND/OR CERTAIN ESTERIFICATION PRODUCTS OR RESINIC ACIDS
Karl Wasem, Wiesbaden-Biebrich, Wilhelm Scharhag, Hochheim am Main, Willi König, Wiesbaden-Sonnenberg, and Johannes Reese, Wiesbaden-Biebrich, Germany, assignors to Chemische Werke Albert, Wiesbaden-Biebrich, Germany, a corporation of Germany
No Drawing. Continuation of application Ser. No. 451,314, Apr. 27, 1965. This application Jan. 31, 1967, Ser. No. 613,033
Claims priority, application Germany, Oct. 23, 1962, C 28,245
Int. Cl. C08g 30/14, 45/08
U.S. Cl. 260—26                    13 Claims

ABSTRACT OF THE DISCLOSURE

The invention is concerned with compositions for production of cured epoxy resins comprising (A) an epoxy resin, (B) an adduct of an epoxy resin and a polyamine, (C) certain phenol-aldehyde resins and/or certain esterification products of resinic acids. It is also concerned with hardening agents for use in said compositions, with coatings and shaped bodies produced from such compositions and with a new method of curing compositions comprising said resins (C) and epoxy resins at unusual low temperature.

PRIOR ART

This application is a continuation of application Ser. No. 451,314, filed Apr. 27, 1965, now abandoned which in turn is a continuation-in-part of application Ser. No. 285,581, filed June 5, 1963, now abandoned.

It is known that the use of amines as hardening agents for epoxy resins has material disadvantages. The amines have an unpleasant odour, and their use is objectionable for physiological reasons and for their property of being harmful to the skin. For these reasons, in the hardening of epoxy resins, amine hardening agents have sometimes been replaced by adducts of polyamines and epoxy resins. The epoxy equivalence of these adducts may be greater or less than one, the term "epoxy equivalence" being used herein as meaning the average number of epoxy groups per molecule possessed by the product. The hardening or curing results from cross-linking due to the reaction of the hydrogen atoms of the amino groups of the adduct (which may be either primary or secondary) with the epoxy groups of the epoxy resins.

It is also known to react epoxy resins with resoles and to cure the product either by heating to a temperature between 140 and 230° C. or by treating the separated product at room temperature with a polyamine such as diethylene triamine.

It is also known to harden epoxy resins by means of heat fusible condensation products obtained from aldehydes and polyhydric substituted or unsubstituted phenols. In the polyhydric phenol two hydroxy groups should be in a meta-position relative to one another. The hardening is carried out at an elevated temperature, particularly between 80 and 220° C., and it is also possible to carry out this curing in the presence of an amine, generally in an amount less than 1% by weight.

It is also known to harden epoxy resins at an elevated temperature using thermosetting resorcinol-formaldehyde condensation products together with 0.5 to 10%, calculated upon the weight of the epoxy resin, of a polyamine.

Epoxy resins have also been hardened using reaction products of resoles and polyamines, which have been prepared at a temperature of at least 70° C., or by using a reaction product of a phenol, an aldehyde and a polyamine containing at least 4 hydrogen atoms bonded to nitrogen per molecule.

Epoxy resins have also been hardened by the combined action of (I) partial esters of adducts of maleic anhydride or fumaric acid with unsaturated monocarboxylic acids of the fatty acid and resin type and polyhydric alcohols and (II) amino compounds such as triethanolamine, dimethylaminomethyl-phenol or quarternary, ammonium bases such as benzyltrimethyl-ammonium hydroxide.

It is an object of the present invention to provide compositions containing an epoxy resin and a hardening agent which are particularly useful in the production of cured epoxy resins.

According to the invention, therefore, there is provided a composition for use in the production of cured epoxy resins which comprises (A) an epoxy resin together with (B) an adduct of an epoxy resin and a polyamine, ($C_1$) a phenolaldehyde resin of the resole type or a derivative thereof, in which the alkylol groups which term is used to include the furylmethylol group are free or completely or preferably in part etherified or esterified and/or ($C_2$) an esterification product of a polyhydric alcohol with ($\alpha$) a resinic acid, or a mixture thereof with a fatty acid, and ($\beta$) an adduct which is an addition product of an $\alpha$, $\beta$-unsaturated dicarboxylic acid or its anhydride with a resinic acid and/or a poly-olefinically unsaturated fatty acid having conjugated double bonds, resin (C) being present in a proportion in the range of from 5% to 40% by weight, based upon the total weight of resin (A) and adduct (B), and the adduct (B) being present in an amount of from 5 to 80%, based upon the weight of resin (A).

This invention also includes within its scope a hardening agent, suitable for use in the production of the composition according to the invention, which comprises a mixture of a component (B) as defined above, and components ($C_1$) and /or ($C_2$) as defined above.

The terms "adduct," "epoxy resin," "polyamine," "phenolaldehyde resin," "phenol," "aldehyde," "ether," "ester," "reaction product," "hydroxy carboxylic acid," "glyceride," "polyhydric alcohol," "resinic acid," "fatty acid," "$\alpha$, $\beta$-unsaturated dicarboxylic acid," "anhydride" and "unsaturated fatty acid" are used herein as including within their scope mixtures of such compounds wherever the context permits.

By the use of the compositions according to the invention, cured epoxy resin films may be prepared which are characterized by an improved resistance to attack by chemical agents and substantially improved adherence properties compared with the previous known products cured by treatment with known hardening agents such as hereinafter described in relation to the preparation of comparison sample A.

The $C_1$ and/or $C_2$ components are preferably present in the compositions in a proportion between 5 and 40%, and preferably between 15 and 40%, by weight based upon the total weight of components A and B present in the composition. With certain compositions, however, a proportion of 7 to 25% by weight is particularly preferred. The preferred proportion of component B to component A is dependent upon the number of hydrogen atoms bonded to nitrogen atoms in the polyamine adduct B. The component B is in general preferably present in a proportion in the range of from 5 to 80%, especially 30 to 80%, based upon the weight of component A. Within these ranges the proportion of the component B which is most advantageously used is higher when the epoxy value of component A is high.

Acetic acid and sodium hydroxide solutions are the chemical agents generally used to study the chemical resistance of cured epoxy resins. Generally it is believed that epoxy resins have a very good resistance to attack by sodium hydroxide solution. Experiments we have carried out, however, show that, even after a relatively short time, the adherence of film-like coatings of epoxy resins on metals, the coatings having been hardened using adducts of epoxy resins and amines such as those used in the preparation of comparison sample A described below, decreases when it is contacted with a 5% sodium hydroxide solution. The film-like coating does not, however, become brittle or show bubbles or any other signs of chemical attack. When testing the resistance of the same coating to attack by 5% acetic acid, a reduction of adherence was generally observed soon after contact and after some time the formation of bubbles also occurred. Both these phenomena occur to a much smaller extent with epoxy resin coatings prepared from the compositions of the present invention.

The compositions according to the invention are not only characterised by improved adherence properties and an improved resistance to attack by chemical agents of cured resins obtained from them but also impart good spreading properties to solutions of the resins which properties are useful when the mixtures are to be applied for coating purposes. The potlife is prolonged and surfaces prepared from the resins are more even and show less pitting than surfaces of epoxy resins cured with amines alone.

This is evident from the comparison tests A and B described below. The compositions of the invention may also advantageously be used for the production of cured varnishes containing fillers and/or pigments since the compatibility of the epoxy resins with fillers and pigments is not impaired by the use of components B, $C_1$ and/or $C_2$. The amount of pigments and filling material used in the varnish is dependent on the use to which the varnish is to be put and may vary within wide limits.

Because of the improvement in the adherence properties and resistance to attack by chemical agents, the compositions of the invention may advantageously be used in the production of cured epoxy resin coatings or films which for some reason cannot be stoved and which nevertheless need to be protected by a varnish film of excellent quality. The compositions of the invention are not only suitable for producing cured epoxy resin protective coatings such as undercoats and topcoats on wood, glass, iron or other metals, concrete, stone and the like but also for other purposes, e.g. as cast resins, adhesives, insulating substances and cold hardening knifing glazes.

Various thermosetting phenol-aldehyde resins of the resole type may be used in the compositions of the invention. There may be mentioned, for instance, resins which may be obtained by condensing in an alkaline medium a phenol with an aldehyde containing 1 to 7 carbon atoms such as acetaldehyde, furfural or, most preferably, formaldehyde.

Preferred phenols include phenols which are unsubstituted in at least two positions ortho- and para- to their hydroxy groups, and where the third such position is substituted, are either unsubstituted or have substituents containing a total of less than four carbon atoms in positions meta to their hydroxy groups. If the phenols contains several substituents these may be the same or different. Preferred substituents are the hydrocarbon radicals containing 1 to 12 carbon atoms such as methyl-, ethyl-, propyl-, isopropyl-, butyl-, sec. butyl-, iso-butyl, tert. butyl-, tert. amyl-, tert. octyl-, cyclohexyl- or phenyl-radicals. Preferably all the hydrocarbon substituents together contain a total of not more than 12 carbon atoms and in one preferred type of phenol the substituent in the position para to the hydroxy group contains 4 to 10 carbon atoms. One particularly useful phenol is phenol itself.

The suitable phenol-aldehyde resins are those of the resole type, obtainable in an alkaline medium, and ethers and esters thereof, in which the alkylol groups are partially or completely etherified by alcohols such as methanol, propanol, isopropanol, n- or iso-butanol, amyl alcohol, octanol, isooctanol, benzyl alcohol, etc., or partially or completely esterified by acids such as acetic acid, propionic acid, butyric acid, etc. Ethers in which the etherifying groups are alkyl or aralkyl groups containing not more than 8 carbon atoms are preferred. The phenol-aldehyde resins may, of course, also be used in a plasticised form, which may be obtained by reaction with hydroxy fatty acids having more than 10 carbon atoms or the glycerides thereof; in this case the chemical resistance is smaller than with coatings containing non-plasticized resins but a considerable improvement in adherence properties is still achieved. Dihydric phenols such as resorcinol may also be used in the preparation of the phenol-aldehyde resin components of the compositions.

The phenol-aldehyde resins are preferably included in the compositions in the form of viscous liquids i.e. in admixture with organic solvents such as low-boiling solvents, for example ethanol, butanol, benzene, toluene or xylene. The resins may, however, also be used in the form of solutions in high boiling liquids. Such liquids are e.g. compounds, which may be used per se as plasticizers in plastisols, e.g. mineral oils, aliphatic or aromatic polyethers, esters of polybasic carboxylic acids, polyglycols, polyhydric alcohols or mixtures of such substances. The low-boiling solvents may be replaced by the said higher boiling solvents, for example by adding to the resins in the low-boiling solvent a suitable amount, e.g. 10 to 50% of one or more of the said higher boiling solvents and distilling off the low-boiling solvents in vacuo, e.g. at a temperature below 100° C.

The component $C_2$ of the hardening agents may comprise the esterification product of a polyhydric alcohol such as, for example, ethylene glycol, diethylene glycol, triethylene glycol, propanediol-1,3 or -1,3, butanediol-1,3, -1,4 or -2,3, butanediol-1,4, 2,2-dimethylpropanediol-1,3 glycerol, trimethylolpropane, 1,2,4 - butanetriol, pentaerythritol or tetramethylolcyclohexanol. The $\alpha,\beta$ - unsaturated dicarboxylic acid used in the preparation of the ($\beta$) adduct is preferably maleic, fumaric, itaconic, mesaconic or citroconic acid. The resinic acid may be, for example, abietic acid or laevopimaric acid, which may be used either per se, or in the form of commercial products such as colophony. Polyolefinically unsaturated fatty acids containing conjugated double bonds which may advantageously be used include isomerised soya bean oil, fish oil or linseed oil fatty acid, dehydrated castor oil fatty acid or tung oil fatty acid. A mixture of fatty acid and resinic acid, such as that contained in tall oil fatty acid, which contains at least 34% by weight of resinic acid and the said polyolefinically unsaturated acids, may also be used. The $C_2$ component of the compositions preferably has an acid number less than 40, particularly in the range 10 to 25.

The epoxy resin of component A and the epoxy resin used in the preparation of the component B preferably have a molecular weight of 300 to 5000, particularly 400 to 3000. Such resins may, for example be obtained from epicholorhydrin, epibromohydrin, dichlorohydrin, or dibromohydrin or diepoxides such as butadienedioxide and mononuclear or polynuclear diphenols such as p,p′-dihydroxydiphenylpropane or its homologues, hydroquinone, resorcinol, o,p′-dihydroxydiphenylmethane, dihydroxydicresylmethane, dihydroxybenzophenones, or dihydroxydiphenyls. The suitable epoxy resins have an epoxy equivalence of at least 1. Where they have an epoxy equivalence of less than 1, they may, however, be used for production of the adduct (B), as is evident from comparison sample B.

For preparing the B components of the compositions the afore-mentioned epoxy resins are reacted in a convenient manner with polyamines, preferably those in which the amino groups are separated from each other by 2 or 3 carbon atoms. At least one mol of amine is preferably used for each gram equivalent of epoxy resin. Preferred amines include ethylenediamine, propylenediamine, diethylenetriamine, dipropylenetriamine, triethylenetetramine, tetraethylenepentamine or asymmetric N-dimethyl-1,3-diaminopropane. In general adducts having an epoxy equivalence greater than 1 are used with particular advantage. The B component is stable, may be recovered free from low molecular amines and is soluble in conventional solvents. In contrast to aliphatic amines, the B component is not toxic, is only sparingly volatile and is only very slightly sensitive to moisture, which is important for attaining an unimpaired hardening.

According to one feature of the invention there is provided a method of producing a cured epoxy resin which comprises allowing a composition according to the invention to stand whereby curing is effected. The curing is in general what is conventionally termed "cold curing," and is conveniently effected at a temperature below 50° C. and especially at room temperature below 30° C. Nevertheless, if desired, the cured resin may be treated with a hot gas, such as hot air at a temperature below 140° C., to effect an additional hardening.

One method of preparing the compositions according to the invention comprises adding a hardening agent comprising components B and $C_1$ and/or $C_2$ as hereinbefore defined to the epoxy resin to be cured (component A). Thus, a hardening agent comprising components B and $C_1$ and/or $C_2$ is a feature of the present invention. An alternative method of preparing the compositions according to the invention comprises mixing the epoxy resin (component A) with the components $C_1$ and/or $C_2$ and then adding the component B to the mixture thus formed.

The following examples, in which parts and percentages are by weight, illustrate the invention:

EXAMPLES 1-6

Comparison sample A

A 50% solution of a commercial epoxy resin, derived from epichlorohydrin and p,p'-dihydroxydiphenyl-2,2-propane (Epikote 1001), in a mixture of xylene, butanol and ethyleneglycolmonoethylether (55:30:15) was prepared. The epoxy resin had a molecular weight of about 900 and an epoxy value of about 0.2. (The expression "epoxy value" indicates the number of epoxy groups per 100 grams of resin.) A 50% solution of a commercial amine adduct obtained from triethylenetetramine and an epoxy resin derived from epichlorohydrin and p,p'-dihydroxydiphenyl-2,2-propane (Epikote 834) and having an epoxy value of 0.34 to 0.44 and an epoxy equivalence between 1.6 and 2 was also prepared in the same solvent mixture as described above. About 40 parts of the solution of the adduct were then added to 100 parts of the solution of the epoxy resin. By adding further amounts of the solvent mixture the viscosity of the solution thus produced was adjusted so that the solution ran within 20 seconds through the standardized borehole of the DIN cup (according to DIN 53211).

The solution was then sprayed onto cleaned but otherwise untreated metal sheets of 0.5 mm. thickness so that layers of hardened film having a thickness between 40 and 50µ were obtained. The adherence of these films and their resistance to attack by chemical agents was examined. Also a solution was applied to glass plates so as to provide a layer thickness of 100µ and the mechanical properties of the hardened films, e.g. the scratch resistance and the pendulum hardness according to König (cf. Farbe und Lack, 1953, p. 435) were assessed. Moreover the nature of shavings removed from the glass base was examined.

The films produced from comparison sample A showed good mechanical properties: the pendulum hardness according to König after a hardening period of 15 days was 200 seconds, which means that the amplitude of the pendulum decreased in 200 seconds to one half of its original value. The scratch resistance and the shavings removed from the glass base were as with the other properties assessed and graded from 0 to 5, 0 indicating very bad and 5 indicating very good results. The shaving was detached from the glass by a knife and its elasticity and strength considered. The scratch resistance and shavings of comparion ample A were graded 4.5 each respectively. The adherence of the resin, which hitherto had been considered in the literature as being very good, had to be graded 1 in view of the values found in the following experiments. When testing the resistance to attack by 5% acetic acid, the fim loosened from the base after about 10 hours whilst, with a 5% sodium hydroxide solution it loosened after about 2 days.

The properties of comparison sample A are compared in Table 1 with the properties of epoxy resin coatings prepared, according to the invention, as set out below. In these examples different amounts of $C_1$ and $C_2$ components were added to the composition of comparison sample A. The viscosity was always adjusted in the same manner and the varnish solutions applied on to bases in the same manner as indicated above:

Example 1

Various amounts of a thermosetting phenol-formaldehyde resin (Phenodur 678U) were added to the composition of comparison sample A. The properties of the film, particularly the adherence and the chemical resistance were improved with the addition of increasing quantities of the phenol-formaldehyde resin. If very large amounts of this resin were used, however, the resistance against sodium hydroxide solution and the mechanical properties of the film were no longer increased, but again reduced compared with the maximum values.

Example 2

A cresol resole, which had been partially etherified by reaction with butanol (Phenodur 194U) was added in the form of a 60% solution to the composition of comparison sample A in an amount of 7.5, 10 and 20% respectively, the quantities being calculated as solid resin. The properties of the product were improved with increasing of cresol resole content and reached an optimum in the case of 20% addition.

Example 3

10 or 20% respectively of a thermosetting phenolformaldehyde resin, based on p,p'-dihydroxydiphenylpropane, were added to the composition of comparison sample A. A significant increase of adherence and resistance to attack by sodium hydroxide solution compared with comparison sample A was observed.

Example 4

Varying amounts of an acid hardening resole, which had been produced by condensing phenol, urea and formaldehyde, were added to the composition of comparison sample A. An increase of the adherence was observed with an increasing resole content. The resistance against alkali decreased, however, when rather large amounts of resole were added.

Example 5

An alkyl phenol-formaldehyde resin which had been prepared by condensation of p-tert.-butylphenol with formaldehyde in an alkaline medium (Alresen 142R) was added to the composition of comparison stmple A. The chemical resistance and the adherence were improved with increasing quantities of alkyl phenol-formaldehyde resin.

Example 6

The composition of comparison sample A was admixed with increasing amounts of a $C_2$ component having an acid number below 40 and a melting range from 108 to 120° C. produced from colophony, maleic acid and glycerol (Alresat 201C). An improved adherence and chemical resistance to attack were observed with increasing amounts of $C_2$ component. When using very high proportions of $C_2$ component, however, the film became brittle.

sample A. The films loosened from the base after 4 hours when exposed to attack by 5% acetic acid, and after 2 days when exposed to attack by 5% sodium hydroxide solution. The properties of comparison sample B are compared in Table 2 with those of the epoxy resin prepared as described below. The various resins were added, in various amounts, to the resin composition of comparison sample B.

Example 7

The phenol-formaldehyde resin used in Example 1 was added to the composition comparison sample B in amounts of 30 and 40% respectively. The films thus obtained showed good mechanical properties, an improved resistance to attack by acetic acid and sodium hydroxide solutions and an especially good adherence.

TABLE 1.—PROPERTIES OF THE PRODUCTS AFTER STORING FOR 15 DAYS AT AN AVERAGE TEMPERATURE OF 20 TO 25° C.

| | Pendulum hardness according to König in seconds | Scratch Resistance Value | Shaving Value | Resistance to attack by 5% acetic acid | | Resistance to attack by 5% sodium hydroxide solution | | Adherence Value |
|---|---|---|---|---|---|---|---|---|
| | | | | Observation after about— | Value | Observation after about— | Value | |
| Comparison Sample A | 200 | 4.5 | 4.5 | 10 hours: loss of adherence | 0.5 | 2 days: loss of adherence | 1 | 1 |
| Example 1: | | | | | | | | |
| (a) 5% | 204 | 4 | 4.5 | 10 hours: formation of bubbles | 0.5 | No examination | | 1.5 |
| (b) 10% | 208 | 4 | 4.5 | do | 0.5 | 2 days: loss of adherence | 1 | 1.5-2 |
| (c) 20% | 195 | 4.5 | 4.5 | 6 hours: reduction of adherence; 1 day: formation of bubbles. | 1-1.5 | 6 days: loss of adherence | 3 | 2.5 |
| (d) 30% | 195 | 4.5 | 4.5 | 1 day: slight formation of bubbles | 2.0 | do | 3 | 3.5-4 |
| (e) 40% | 188 | 4 | 4 | 1 day: slight formation of bubbles, loss of adherence. | 1.5-2 | 8 days: reduction of adherence | 4.5 | 3.5-4 |
| Example 2: | | | | | | | | |
| (a) 7.5% | 184 | 4 | 4.5 | 10 hours: loss of adherence | 0.5 | 2 days: loss of adherence | 1 | 2 |
| (b) 10% | 181 | 4 | 4.5-5 | do | 0.5 | 28 hours: reduction of adherence; 4 days: loss of adherence. | 2 | 2.5 |
| (c) 20% | 191 | 3.5-4 | 4.5-5 | 1 day: formation of bubbles | 1.5-2 | 8 days: loss of adherence | 4 | 3-3.5 |
| (d) 30% | 171 | 3.5-4 | 4.5 | 10 hours: loss of adherence | 0.5 | 10 hours: becomes brittle | 0-0.5 | 3.5 |
| Example 3: | | | | | | | | |
| (a) 10% | 195 | 4.5 | 4.5 | do | 0.5 | 1 day: reduction of adherence; 4 days: loss of adherence. | 2 | 1.5-2 |
| (b) 20% | 185 | 4.5 | 4.5 | do | 0.5 | do | 2 | 1.5-2 |
| Example 4: | | | | | | | | |
| (a) 7.5% | 181 | 3.5 | 5 | 5-10 hours: loss of adherence | 0-0.5 | 28 hours: reduction of adherence; 4 days: swelling. | 2 | 1.5 |
| (b) 10% | 163 | 4 | 4.5 | do | 0-0.5 | 28 hours: reduction of adherence; 4 days: loss of adherence. | 2 | 2.5-3 |
| Example 5: | | | | | | | | |
| (a) 7.5% | 186 | 4 | 4.5 | 10 hours: loss of adherence | 0.5 | 2 days: reduction of adherence; 4 days: swelling. | 2 | 1.5 |
| (b) 10% | 188 | 4 | 4.5 | do | 0.5 | 5 days: reduction of adherence; 7 days: loss of adherence. | 3.5 | 1.5 |
| (c) 20% | 192 | 4 | 4-4.5 | 1 day: formation of bubbles | 1.5-2 | 8 days: loss of adherence | 4 | 1.5-2 |
| (d) 30% | 203 | 3.5-4 | 4 | do | 1.5-2 | 8 days: reduction of adherence | 4.5 | 3.5-4 |
| (e) 40% | 191 | 4 | 3.5-4 | 9 hours: reduction of adherence; 2 days: loss of adherence. | 3.0 | 8 days: loss of adherence | 4.5 | 4 |
| Example 6: | | | | | | | | |
| (a) 7.5% | 204 | 4 | 4.5 | 10 hours: loss of adherence | 0.5 | 2 days: strong reduction of adherence. | 1.5 | 1-1.5 |
| (b) 20% | 207 | 3.5-4 | 4.5 | do | 0.5 | do | 1.5 | 1.5-2 |
| (c) 30% | 209 | 3-3.5 | 3.5 | 1 day: loss of adherence | 2.0 | 2 days: reduction of adherence; 3 days: loss of adherence. | 2 | 3.5 |
| (d) 40% | 210 | 3-3.5 | 2 | 2 days: becomes slightly brittle | 3.0 | 11 days: loss of adherence | 4.5 | 3.5-4 |

EXAMPLES 7–10

Comparison sample B 100 parts of the 50% solution of the commercial epoxy resin used for preparing comparison sample A in Examples 1–6 was admixed with 60 parts of a 50% solution of an amine adduct in the same solvent mixture. (The amine adduct had been prepared from triethylenetetramine and an epoxy resin derived from epichlorohydrin and p,p'-dihydroxydiphenyl-2,2-propane, having an epoxy equivalence between 0.5 and 1.) The viscosity of the solution was then adjusted and films produced from the solution were tested and graded in the same manner as described in Examples 1–6.

Results: The films obtained from comparison sample B also showed good mechanical properties. After a hardening period of 5 weeks the films showed a pendulum hardness according to König of 202 seconds, a scratch resistance of 4 to 4.5 and the shavings were given the value 4.5. The adherence of this resin was better than that of comparison sample A and was given a value of about 2 to 2.5 compared with the value of 1 for comparison

Example 8

20% of the partially etherified cresol resole of Example 2 were added to the composition of comparison sample B. The mechanical properties of the resin thus obtained were good, the resistance to attack by acetic acid and sodium hydroxide solutions was improved and the adherence was especially good.

Example 9

A resin was prepared by mixing the composition of comparison sample B and 30% of the $C_2$ component of Example 6. This resin showed a good pendulum hardness and scratch resistance. The chemical resistance, particularly against acetic acid, was improved compared with comparison sample B. The adherence was very good.

Example 10

A resin was prepared by admixing varying amounts of the alkylphenol-formaldehyde resin of Example 5 to the components of comparison sample B. The final product had good mechanical properties, a much improved resistance against sodium hydroxide and acetic acid and an especially good adherence.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

TABLE 2.—PROPERTIES OF THE PRODUCTS AFTER STORING FOR 5 WEEKS AT AN AVERAGE TEMPERATURE OF 20 TO 25° C.

| | Pendulum hardness according to König in seconds | Scratch Resistance Value | Shaving Value | Resistance to attack by 5% acetic acid | | Resistance to attack by 5% sodium hydroxide solution | | Adherence Value |
| --- | --- | --- | --- | --- | --- | --- | --- | --- |
| | | | | Observation after about— | Value | Observation after about— | Value | |
| Comparison Sample B | 202 | 4.5–5 | 4.5 | 4 hours: loss of adherence | 0–0.5 | 1 day: reduction of adherence; 30 hours: strong reduction of adherence; 2 days: small spots of rust. | 1 | 2–2.5 |
| Example 7: | | | | | | | | |
| (a) 30% | 174 | 4 | 4.5 | 8½ hours: strong reduction of adherence; 1 day: loss of adherence, becomes brittle. | 1.5–2 | 30 hours: strong reduction of adherence; 56 hours: loss of adherence. | 1–1.5 | 5 |
| (b) 40% | 165 | 3.5 | 4 | do | 1.5–2 | 30 hour: strong reduction of adherence; 56 hours: strong reddening of the film. | 1 | 5 |
| Example 8: | | | | | | | | |
| (a) 20% | 186 | 4.5 | 4 | 8½ hours: reduction of adherence; 1 day loss of adherene, becomes brittle. | 1.5–2 | 1 day: strong reduction of adherence; 56 hours: loss of adherence. | 1–1.5 | 5 |
| Example 9: | | | | | | | | |
| (a) 30% | 198 | 3.5 | Very brittle | 8½ hours: reduction of adherence; 56 hours: loss of adherence. | 2.5–3 | 30 hours: reduction of adherence; 5 hours: loss of adherence. | 1.5 | 4.5–5 |
| Example 10: | | | | | | | | |
| (a) 30% | 177 | 4.5–5 | 4–4.5 | 1 day: strong reduction of adherence; 2 days: becomes brittle. | 2.5–3 | 56 hours: reduction of adherence; 8 days: loss of adherence. | 4 | 5 |
| (b) 40% | 152 | 4.5 | 4.5 | 1 day: reduction of adherence; 2 days: small spots of rust; 56 hours: becomes brittle. | 3.0 | 2 days: reduction of adherence; 8 days: loss of adherence. | 4 | 5 |

What is claimed is:

1. A composition for use in the production of cured epoxy resins which comprises (A) an epoxy resin having a molecular weight of 300 to 5000 and having an epoxy equivalence of at least one, (B) an adduct of an epoxy resin of a molecular weight of 300 to 5000 and a polyamine and (C) a resin selected from the group consisting of ($C_1$) phenol-aldehyde resins of the resole type in which the alkylol groups are free, ($C_2$) phenol-aldehyde resins in which the alkylol groups are at least partially etherified with alcohols having up to 8 carbon atoms, ($C_3$) phenol-aldehyde resins in which the alkylol groups are at least partially esterified with a fatty acid, ($C_4$) esterification products in which aliphatic polyhydric alcohols are esterified with a mixture of (a) an acid member selected from the group consisting of resinic acids and mixtures of resinic acids with fatty acids and (b) a product obtained by the addition reaction of a member selected from the group consisting of (1) $\alpha,\beta$-unsaturated dicarboxylic acids and anhydrides thereof with (2) at least one member selected from the group consisting of resinic acids and polyolefinic unsaturated fatty acids having conjugated double bonds, ($C_5$) mixtures of at least two resins of groups ($C_1$) to ($C_4$), resin (C) being present in a proportion in the range of 5 to 40% by weight, based upon the total weight of resin (A) and adduct (B), and the adduct (B) being present in amount of 5 to 80% based on the weight of resin (A).

2. A composition as claimed in claim 1, wherein the epoxy resins of component (A) and adduct (B) have a molecular weight between 400 and 3000, wherein the adduct (B) is present in a proportion in the range of from 30 to 80% by weight based upon the weight of epoxy resin (A), wherein resin (C) is present in a proportion in the range of from 15 to 40% by weight based upon the total weight of resin (A) and adduct (B), wherein the aldehyde component of the phenol-aldehyde resin is formaldehyde and wherein the esterification product ($C_4$) has an acid number between 10 and 40.

3. A composition as claimed in claim 1 which contains a phenol-aldehyde resin together with an organic solvent.

4. A composition of claim 1 wherein adduct (B) is prepared by reacting at least one mole of a polyamine in which adjacent amino groups are separated by 2 to 3 carbon atoms with one gram equivalent of an epoxy resin and resin (C) is a condensation product of the resole type of a phenol with an aldehyde of 1 to 7 carbon atoms, resin (C) being present in a proportion of 15 to 40% by weight and adduct (B) being present in a proportion of 30 to 80% by weight.

5. A composition of claim 1 wherein adduct (B) is prepared by reacting at least one mole of a polyamine in which adjacent amino groups are separated by 2 to 3 carbon atoms with one gram equivalent of an epoxy resin and resin (C) is an etherification product of a resole type condensation product of a phenol with an aldehyde of 1 to 7 carbon atoms, resin (C) being present in a proportion of 15 to 40% by weight and adduct (B) being present in a proportion of 30 to 80% by weight.

6. A composition for use in the production of cured epoxy resins which comprises (A) an epoxy resin having a molecular weight of 300 to 5000 and having an epoxy equivalence of at least one, (B) an adduct of an epoxy resin of a molecular weight of 300 to 5000 and a polyamine, in which adjacent amino groups are separated by 2 to 3 carbon atoms, prepared by reacting at least one mole of said polyamine with one gram equivalent of said epoxy resin, and (C) an esterification product having an acid number of less than 40 and in which a polyhydric alcohol is esterified with a resinic acid and an addition product is obtained by the addition reaction of an $\alpha,\beta$-unsaturated dicarboxylic acid compound with a resinic acid, resin (C) being present in a proportion in the range of 5 to 40% by weight, based upon the total weight of resin (A) and adduct (B), and the adduct (B) being present in an amount of 5 to 80% based on the weight of resin (A).

7. A composition as claimed in claim 6, wherein the said addition product has been obtained from the reaction of an $\alpha,\beta$-unsaturated dicarboxylic acid anhydride and a resinic acid.

8. A composition as claimed in claim 6, in which the resin (C) has an acid number between 10 and 25 and wherein the resinic acid is provided by tall-oil.

9. Articles selected from the group consisting of coatings and shaped bodies comprising a cured epoxy resin obtained from the composition of claim 1.

10. A method of producing coatings of a cured epoxy resin composition which comprises admixing an epoxy resin (A) and an adduct (B), both as defined in claim 1, to a resin (C) as defined in claim 1, applying the resulting resin composition to a substrata and exposing the resulting coatings to a temperature below 50° C. whereby curing of both the epoxy resin and the resin (C) is effected.

11. A method of producing coatings of a cured epoxy resin composition as claimed in claim 10 wherein curing of the composition is effected by standing at room temperature.

12. A hardening agent for curing (A) epoxy resins having a molecular weight of 300 to 5000 and having an epoxy equivalent of at least one comprising (B) an adduct of an epoxy resin of a molecular weight of 300 to 5000 and a polyamine and (C) an esterification product in which at least one aliphatic polyhydric alcohol is esterified with a mixture of (a) an acid member selected from the group consisting of resinic acids and mixtures of resinic acids with fatty acids and (b) a product obtained by the addition reaction of a member selected from the group consisting of (1) $\alpha,\beta$-unsaturated dicarboxylic acids and anhydrides thereof with (2) at least one member selected from the group consisting of resinic acids and polyolefinic unsaturated fatty acids having conjugated double bonds.

13. A hardening agent for curing (A) epoxy resins having a molecular weight of 300 to 5000 and having an epoxy equivalence of at least one comprising (B) an adduct of an epoxy resin of a molecular weight of 300 to 5000 and a polyamine and (C) a condensation product of the resole type of an aldehyde and a para-alkylphenol.

References Cited

UNITED STATES PATENTS

| | | | |
|---|---|---|---|
| 2,490,550 | 12/1949 | Sermattei | 260—28.5 |
| 2,741,651 | 4/1956 | Been | 260—43 |
| 2,986,546 | 5/1961 | Naps | 260—38 |
| 3,057,756 | 10/1962 | Cornwell | 117—145 |
| 3,177,089 | 4/1965 | Marshall | 260—24 |

FOREIGN PATENTS 691,543  5/1953  Great Britain.

OTHER REFERENCES

Lee et al.: Epoxy Resins (1957), pp. 70–73 relied on.
Bulletin of Chemische Werke Albert, Wiesbaden-Biebrich, Albert Handbuch, Phenodur 678U (1958), 3 pages.
Bulletin of Chemische Werke Albert, Wiesbaden-Biebrich, Albert Handbuch, Phenodur 194U, August 1963, 4 pages.

DONALD E. CZAJA, Primary Examiner

WILLIAM E. PARKER, Assistant Examiner

U.S. Cl. X.R.

260—19, 22, 24, 831